Feb. 3, 1959 C. W. HOBSON 2,872,144
ADJUSTABLE BRACKET SUPPORTS FOR DISPLAY AND OTHER PURPOSES
Filed July 20, 1953 6 Sheets-Sheet 1
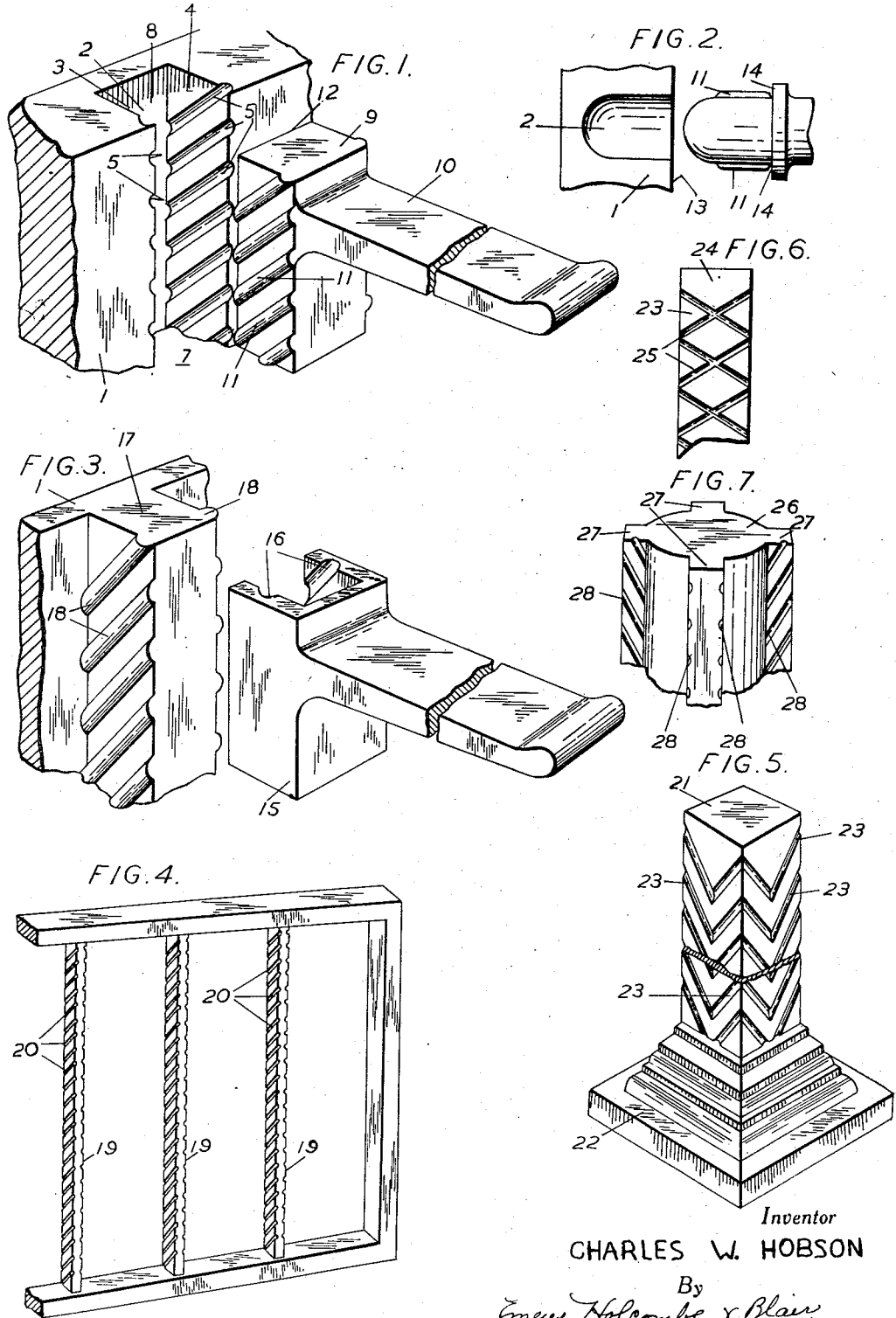
Inventor
CHARLES W. HOBSON
By
Emery Holcombe & Blair
Attorney Feb. 3, 1959 C. W. HOBSON 2,872,144
ADJUSTABLE BRACKET SUPPORTS FOR DISPLAY AND OTHER PURPOSES
Filed July 20, 1953 6 Sheets-Sheet 2
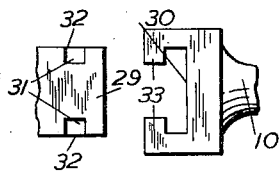
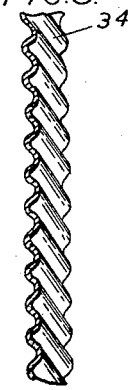
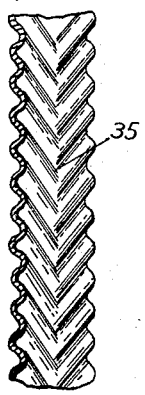
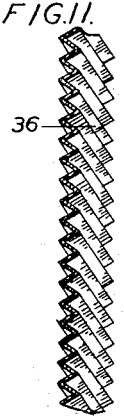
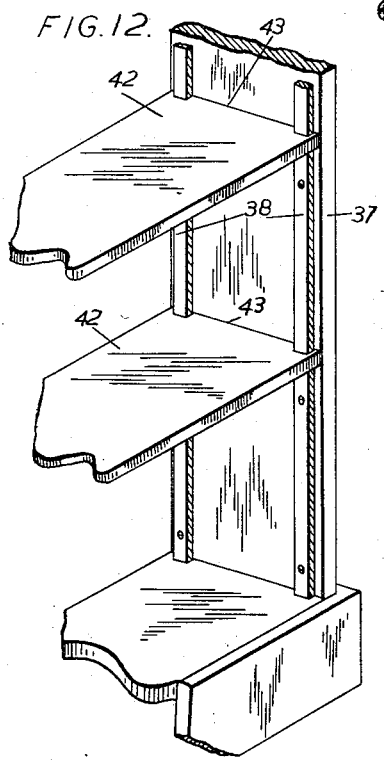
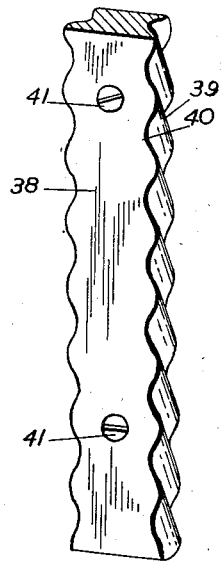
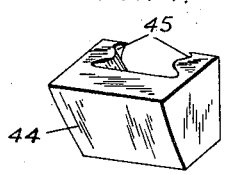
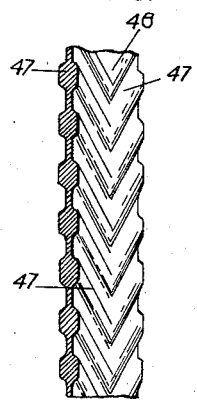
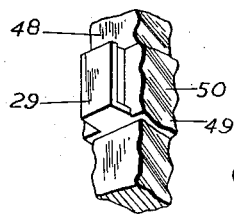
Inventor
CHARLES W. HOBSON
By
Emery Holcombe & Blair
Attorney

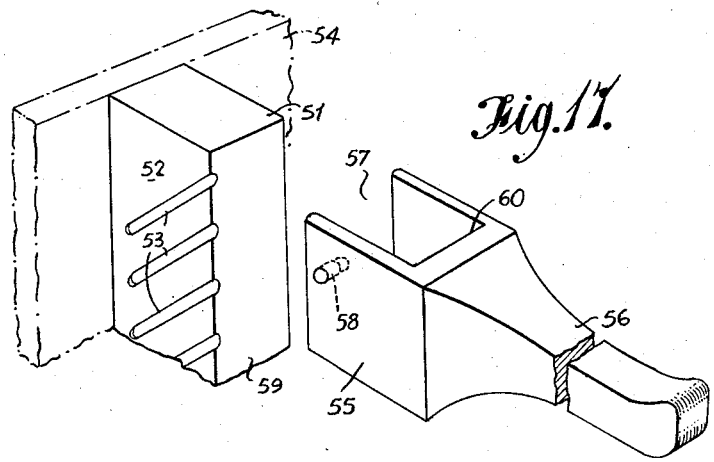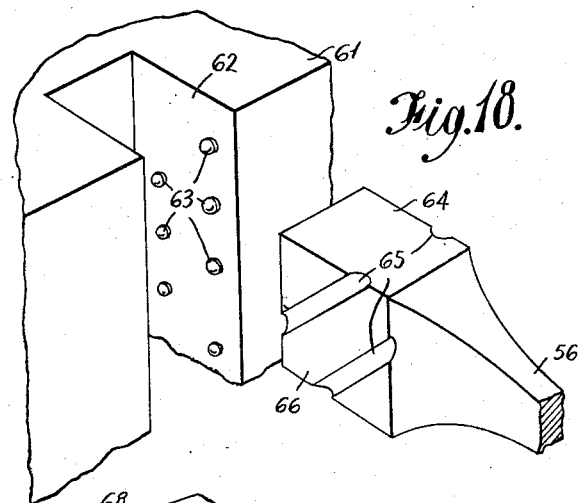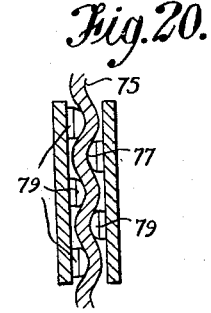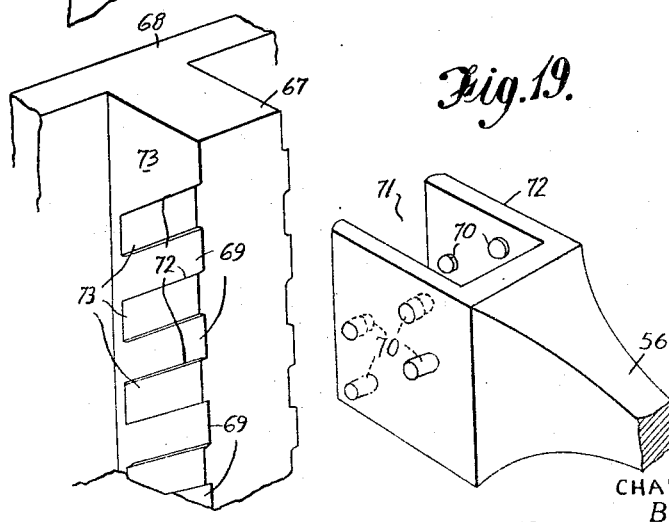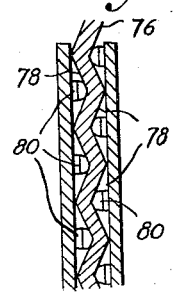

Feb. 3, 1959 C. W. HOBSON 2,872,144
ADJUSTABLE BRACKET SUPPORTS FOR DISPLAY AND OTHER PURPOSES
Filed July 20, 1953 6 Sheets-Sheet 4
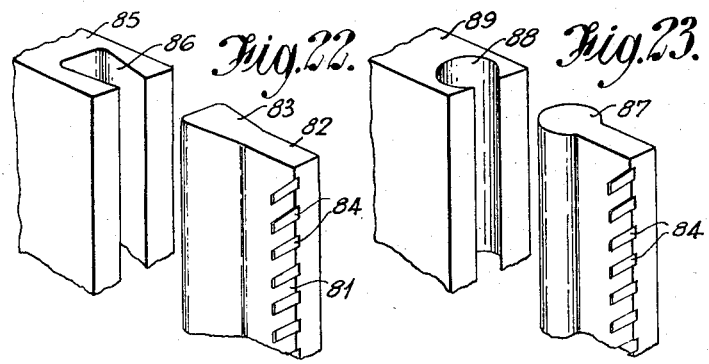
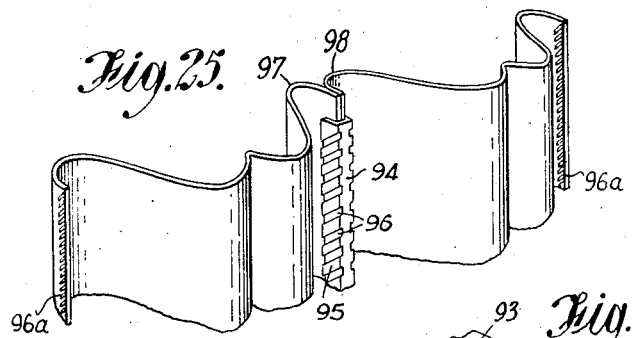
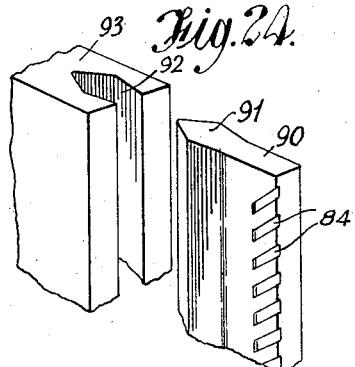
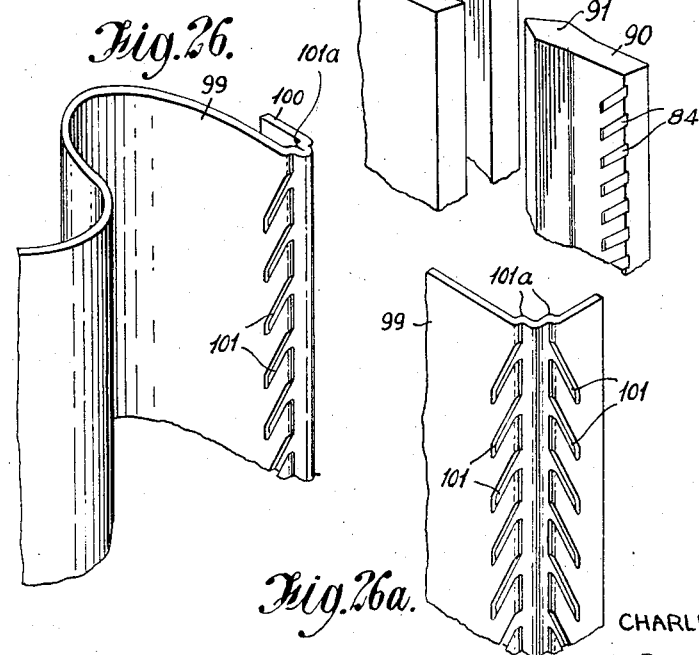
Inventor
CHARLES W. HOBSON
By Emery Holcombe & Blair
Attorney

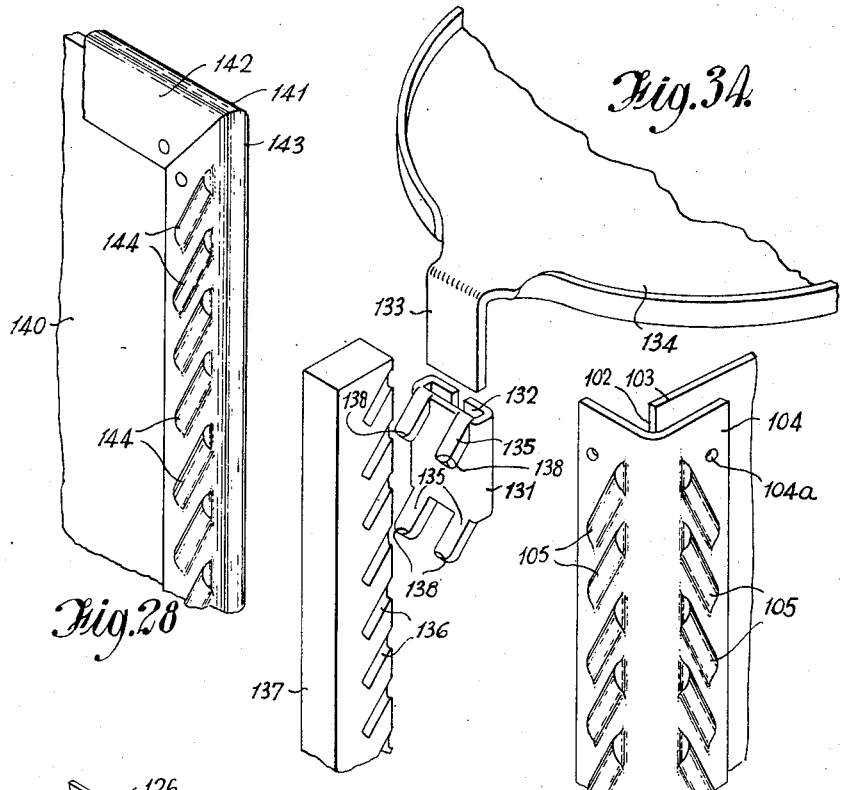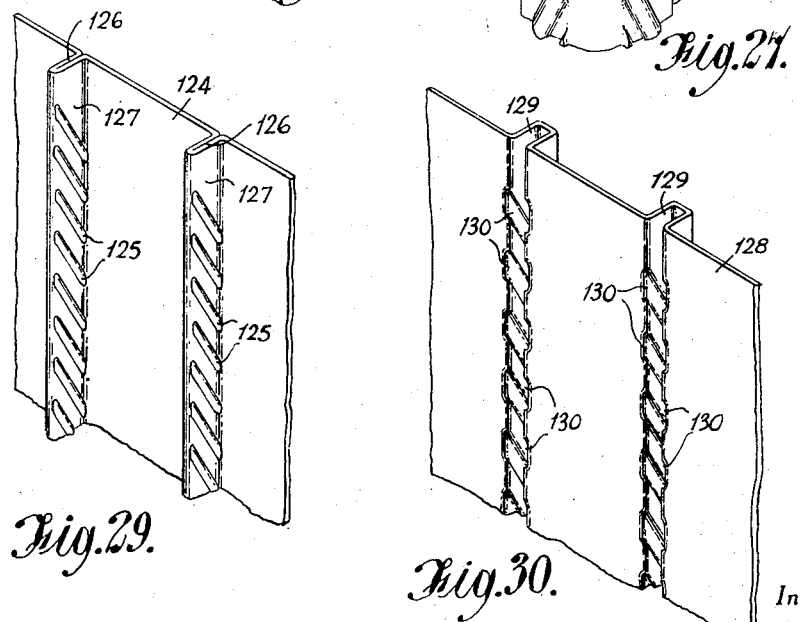

Feb. 3, 1959 C. W. HOBSON 2,872,144
ADJUSTABLE BRACKET SUPPORTS FOR DISPLAY AND OTHER PURPOSES
Filed July 20, 1953 6 Sheets-Sheet 6

Inventor
CHARLES W. HOBSON
By
Imay Holcombe & Blair
Attorney

United States Patent Office 2,872,144
Patented Feb. 3, 1959

2,872,144

ADJUSTABLE BRACKET SUPPORTS FOR DISPLAY AND OTHER PURPOSES

Charles William Hobson, Buckinghamshire, England, assignor to Nancy Hobson

Application July 20, 1953, Serial No. 369,143

Claims priority, application Great Britain October 28, 1952

3 Claims. (Cl. 248—223)

This invention relates to adjustable bracket supports suitable for use in shop windows, upon counters and elsewhere for displaying merchandise as well as for other purposes, for example, for supporting shelves of all descriptions in an adjustable manner, such as for bookcases, cupboards and storage bins.

According to the present invention, an adjustable bracket support comprises a supporting member adapted for arrangement in an upright or a generally upstanding position, carrying one or more than one outwardly projecting brackets adjustably positioned on the supporting member by a bearer member provided at the inner end of the bracket and adapted releasably to engage the supporting member, either the supporting member or the bearer member having a generally upwardly extending channel or slot therein into which a part of the other member is received, wherein one or both of the side faces either of the said channel or slot or the said part of one member is or are formed as or provided with guideways inclined downwardly in a direction away from the projecting bracket, and the said part or the said channel or slot (as the case may be) of the other member constituting, or having its side face or faces formed as or provided with elements constituting one or more guide members slidably interfitting with said guideways, the width of the channel or slot being such that the guideways and guide members will be held in interfitting relationship, the arrangement enabling the bearer member to be separated from the supporting member by sliding it upwardly and away from the supporting member and re-engaged with the supporting member at the same or a different position thereon by a reverse sliding movement, the extent to which the parts may be engaged being limited by an abutment on the supporting member.

With the arrangement according to the invention, the bearer and the bracket carried thereby cannot slip downwardly or fall away from the supporting member, whilst adjustment of the position at which the bracket is carried on the supporting member can be easily and quickly effected.

Whilst it is preferred that each of a pair of inter-engaging side faces of the channel or slot and the part fitting therein should be formed with a plurality of the aforesaid inter-fitting guideways or guide members, it will be appreciated that only the side face or faces of the supporting member need be formed with a plurality of such guideways or guide members, and that it is sufficient, particularly when the bracket is intended to support only a light weight, to provide the side face or faces of the bearer with only a single interfitting guide member or guideway.

The aforesaid inter-fitting guideways or guide members formed in or on the side face or faces of the supporting member may extend in regular and uniform spacing along that portion of the supporting member within which the bearer is adapted to be fitted or, alternatively, they may be provided only at interrupted intervals along its height.

The guide members may comprise a rib or ribs on the one part cooperating with guideways formed by a groove or grooves on the other part. Alternatively, in place of a rib there may be provided a single pin, stud, pimple or other protuberance adapted to engage in a groove provided in the other part. Hereinafter such protuberances will be referred to as "pins." If desired, a rib may be replaced by several pins, for example, two or three which would extend along a line corresponding to the line of a rib. The space between two pins in a vertical direction, or between two rows of pins, could also constitute a guideway. These pins may be of circular, elliptical or other desired cross-section.

In accordance with another embodiment of the invention the guide members are constituted by inclined fingers projecting from the supporting member or the bearer member. In one such embodiment the bracket is made of sheet material, the bearer member being formed by a slot in a portion of the bracket which is bent downwards out of the plane of the bracket, the side walls of the slot constituting guide members for engagement with guideways on a supporting member.

In order that the invention may be more clearly understood, reference will now be made to the accompanying drawings which show some embodiments thereof by way of example, and in which:

Fig. 1 represents a first form of the invention showing a channelled support in perspective.

Fig. 2 shows a plan of a modification of the support and bearer for the bracket.

Fig. 3 shows a perspective view of a further modification in which the support comprises a fillet and the bearer for the bracket is channelled.

Fig. 4 shows a supporting member in the form of a trellis, grille or other openwork structure.

Fig. 5 shows a supporting member in the form of an upright pillar.

Fig. 6 shows one side of a portion of a supporting member having channels or grooves in diamond form.

Fig. 7 shows a modification of a supporting member having a circular cross-section.

Fig. 8 shows one form of bracket which is detachable from its bearer.

Figs. 9, 10 and 11 show how ribs and grooves may be formed in a piece of material which may be applied to or used as a supporting or bearer member.

Fig. 12 shows the application of the invention to shelving.

Figs. 13 and 14 show details of Fig. 12.

Fig. 15 shows how a chevron-like pattern may be formed in a piece of material used as a supporting member.

Fig. 16 shows a modification of bearer.

Fig. 17 represents another form of the invention in which a single pin is adapted to ride in any one of a plurality of grooves.

Fig. 18 shows an arrangement in which the supporting member is channelled and provided with vertically-spaced rows of pins adapted to engage grooves provided on the outside of a fillet forming part of the bracket bearer.

Fig. 19 shows a vertical supporting member provided with grooves wider than the diameter of pins projecting from the walls of the channelled bracket bearer with which it is used in conjunction.

Figs. 20 and 21 show variants using corrugated material for a member containing grooves at its side faces.

Figs. 22 to 24 show various forms of supporting member mountable on and demountable from a separate holding device.

Figs. 25 to 27 show various forms of supporting members made from sheet material.

Fig. 28 shows how a supporting member according to the invention may be applied to a show-card or the like.

Figs. 29 and 30 show further modifications of the invention in which the supporting members are formed in a sheet of flat material, and Figs. 31 to 34 show further forms of the invention in which the bracket is in the form of a shelf or tray.

Figure 31:
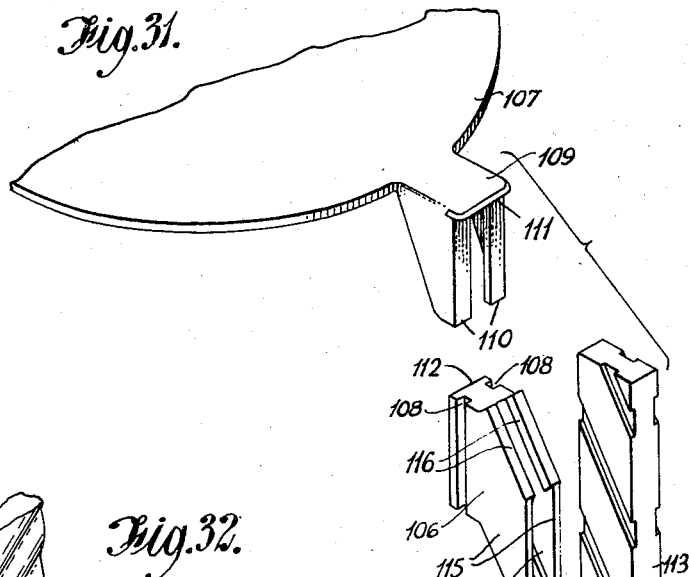

In one arrangement, the supporting member 1 is formed or provided with one or more upright channels 2 therein, preferably of substantially rectangular section as shown in Fig. 1, the side faces 3 and 4 of each of which are flat and provided with a series of parallel grooves 5 inclined downwardly away from the mouth 7 of the channel towards its bottom 8 and forming the guideways. The sides of the bearer member or members 9 of one or more brackets 10 are provided each with external ribs 11 inclined downwardly away from the bracket and forming the guide members. The bottom 8 of the channel may form an abutment against which the inner face 12 of the bearer 9 is stopped when the bearer is engaged in the channel, or alternatively as shown in Fig. 2, the edges of the supporting member 1 adjacent the mouth of the channel at 13 may form said abutment against which a flange or shoulder 14, on the bearer 9, bears. Fig. 2 also shows a modification of the section of the channel 2: it may be U-shaped as shown in Fig. 2 or be given any configuration found suitable to requirements. Although Fig. 1 shows the channel and bearer provided with grooves and ribs respectively with flats between adjacent pairs, it will be understood that ribs could be provided in the channel and cooperating grooves in the faces of the bearer. Also, other shapes of ribs and grooves may be employed for example, rectangular grooves: some further patterns are shown in Figs. 9 and 11 in which the appropriate surfaces are alternately grooved and ribbed with no intermediate plane surfaces.

In an alternative arrangement, illustrated in Fig. 3, the bearer member 15 is provided with internal grooves 16 and the supporting member 1 with a vertical fillet or projection 17 having external ribs 18. It will be understood that the locations of the ribs and grooves in Fig. 3 may be reversed in a manner similar to the arrangements discussed above in connection with Fig. 1 and similarly the configuration of the inter-fitting surfaces may take other forms. In each case however, the arrangement is such that the ribs and grooves, as the case may be, are inclined in a direction downwardly and inwardly of the supporting member so that the bearer is engaged with the supporting member by moving it forwards towards the supporting member, in which it slides in a downwards direction until stopped by the abutments.

It will also be understood that the section of the channels or fillets may be other than rectangular or substantially U-shaped: for example they may be triangular if desired with suitable design of the interfitting ribs and grooves.

In another form, shown in Fig. 4, the supporting member may comprise a grille or other openwork structure, as shown, having upright bar elements 19 which are of rectangular section and have their opposite sides grooved as shown at 20 although they may be ribbed or ribbed and grooved if desired. In another form shown in Fig. 5, the supporting member may comprise an upright pillar 21 provided with any suitable kind of base, such as a pedestal 22 or fixing bracket, and having its opposite sides ribbed or grooved, or, ribbed and grooved, as described. This pillar is shown as having a square cross-section, each pair of its opposite sides being ribbed or grooved or ribbed and grooved so that a channelled bearer, such as shown in Fig. 3 may be selectively engaged with the pillar so that the bracket will project from any one of its sides. More than one bracket may be supported from the pillar, the brackets projecting from the same or different sides. The pillar may be provided on each of its sides with two sets of ribs or grooves (shown as grooves 23) which extend in a downwardly inclined direction from the opposite edges of each side of the pillar, part- or halfway across that side, so that the ribs and/or grooves of the two rows are oppositely inclined in a chevron-like arrangement as shown, and permit brackets to be mounted on and project from all sides of the pillar. Alternatively, each pair of sides may have only the one set of ribs and/or grooves so that brackets may project only from two adjacent sides. If desired the chevron pattern may be replaced by a diamond pattern as shown (on one face only) in Fig. 6, the upright 24 having grooves 25 and the bracket bearers having ribs. The embodiment of Figs. 5 and 6 permit two brackets on opposing faces to be engaged and supported at the same level, provided that the length of the side walls of the channels of the bearers do not exceed half the width of the pillar face.

Although the pillar described has a square cross-section, it will be understood that pillars having other cross-sections, such as hexagonal or octagonal may be used if desired.

A supporting member provided with one or more channels or fillets as illustrated in Figs. 1, 2 and 3, may be in the form of a pillar of circular, oval, flat or any other desired cross-sectional shape and of any desired material, e. g., aluminium or other metal, or glass, plastic, papier mache, cardboard or any other suitable non-metallic material.

Fig. 7 shows a pillar 26 of circular section having a plurality of fillets 27 each provided with grooves 28. It will be understood that a supporting member of any desired section may be employed in conjunction with channels or fillets as occasion demands. The pillar which may be of tubular or solid construction may be extruded, pressed, cast or moulded, as may be suitable for the material employed.

Alternatively, the supporting member may be in the form of a panel or strip or openwork frame, such as a trellis or grille, which may be of generally flat or of any desired curved configuration and may be made up in various decorative and other forms as desired. For example, the supporting member may be constructed as a panel to serve as a wall panel or surface or partition, or as a frame to contain a showcard, or to surround various forms of advertisement display, or may be constructed in strip and panel from suitable for mounting, for example, on a wall or for use as a screen or partition in a shop window or elsewhere, or in the form of a strip for use in the internal corners or on the back or sides of a show case. A panel or strip may be made of corrugated form providing a required channel or channels therein or equivalent fillet or fillets thereon. Strips or panels having their side edges grooved or ribbed or grooved and ribbed downwardly and inwardly may be mounted on a wall or other surface so that the intervals between the contiguous strips or panels form channelled supporting members having guideways and/or guide members for interfitting relationship with a suitably formed bracket bearer member. Such strips or panels may be suitably decorated on their exposed faces by stamping, casting or any other convenient method. A supporting member in the form of a panel, strip, trellis or pillar as earlier mentioned may be made of any desired material and by any suitable process, as above-mentioned.

A bracket may be permanently attached to or formed integrally with its bearer member. Alternatively, the bracket may be detachable from the bearer member and thus allow interchangeable brackets, e. g., of different patterns, to be fitted to the same bearer. For example, as shown in Figs. 8 and 16, the bearer member may have a longitudinal outer portion of T-section as at 29 to receive slidably and detachably a correspondingly T-slotted head 30 on the inner end of the bracket 10. The bottom ends of the channels 31 in the bearer member may be closed at 32 to limit downward movement of the bracket 10, or alternative means may be provided for this purpose. Alternatively any other convenient method of detachably fixing the bracket to the bearer may be employed.

The inclined ribs and grooves may be formed in any suitable way, either simultaneously with the formation of the member (supporting member or bearer) carrying them, as in the case of an externally ribbed and grooved member, such as an upright as earlier described, which may be moulded or cast (for instance, in metal, glass or a plastic) with the ribs and grooves cast in situ; or the ribs and grooves may be formed in a subsequent operation, e. g., by rolling, milling or pressing, this mode of forming the ribs and grooves subsequently being applicable especially (but not exclusively) in the case of a channelled member. Thus, for example, a channelled member or a fillet (either a supporting member or a bearer member as the case may be) may be formed by extrusion, and the sides of the channel or channels or the sides of the fillet or fillets afterwards stamped, rolled or milled to form the ribs and grooves. The extruded channelled member may have each channel side wall formed with a longitudinal raised land in which grooves are afterwards stamped or milled to form the inclined ribs and grooves. In another method of construction, the ribs and grooves of the supporting member may be rolled or pressed or otherwise formed from separate sections of metal, or other material and afterwards fixed to the supporting member by any known method, for example, spot welding, sticking or riveting. Examples of this form of construction are shown in Figs. 9 to 11. In Fig. 9 a strip of metal or other suitable material 34 is corrugated in semi-cylindrical manner to provide alternate ribs and grooves along its length. In Fig. 10 the strip 35 is provided with a chevron-like arrangement of corrugations suitable for use on a supporting pillar or the like similar to the arrangement of Fig. 5. Fig. 11 shows a variation of the corrugations in sawtooth or triangulated form on a strip 36. If desired, the supporting member may be formed with one or more shaped slots or keyways adapted to retain a part of an appropriately-shaped fillet whose side faces exterior of the supporting member are provided with guideways and/or guide members of the desired configurations. Arrangements of this nature will be described later in conjunction with Figs. 22 to 24.

The channelling in the surface of a channelled supporting member presents a certain decorative effect which may be enhanced or supplemented in any desired way. For example, the portions of the surface of the supporting member between channels therein may be provided with any desired decorative design or pattern. Such portions may be flat or alternatively they may be of convex, concave or any other desired contour. Such contouring and the application of decorative designs or patterns may be carried out in producing the supporting member by stamping, by casting or by extrusion. Such portions may also be of one colour while the channel or channels may be of another colour or colours so that a coloured striped effect is produced. A supporting member made of aluminium lends itself particularly well to such two-colour or multi-colour treatment by the anodising process.

The channel may have any desired width, e. g., from 1/16 inch to 1 inch or more. A channelled supporting member may be provided with a plurality of channels, in order to allow a wide variety of possible dispositions of a bracket or brackets thereon as well as lending itself to the production of a greater variety of decorative effects. The channels may be spaced apart at any desired close or wide intervals, regular or irregular.

What has been described above with regard to the decorative effect, width and number of channels in a channelled (i. e. internally ribbed and grooved) supporting member applies equally to the equivalent fillets, trellis bars and the like of an externally ribbed and grooved supporting member.

Figs. 12 to 14 show the application of the invention for supporting shelves for multifarious purposes, such as book-shelves, stock shelves, cupboards, storage bins and so on, the individual shelves being rapidly and easily adjustable in height. In Fig. 12, which shows the general lay-out of the adjustable shelving, a casing or framework 37 is provided with supporting members 38 which may be of the form shown in Fig. 13, that is to say, a fillet whose exterior sides are corrugated to form alternate ribs 39 and grooves 40, as shown. These fillets may be attached to the framework 37 by screws 41 or any other convenient means. If two pairs of fillets are attached to the inner walls of a cupboard, bookcase or the like, a short bracket would be associated with each of the four fillets and all at the same height, and a shelf placed on the inwardly projecting brackets. Alternatively, a shelf could have two bearer members secured to one of its sides only and the shelf placed in position by interfitting the two bearer members over two fillets. Thus, the shelves 42 could rest by their ends as at 43 on four brackets having bearer members 44, as shown in Fig. 14, of channel section and provided with corrugated internal side faces 45, the corrugations matching those of the supporting members 38. Alternatively, as mentioned above, the bearer members 44 could be secured, preferably in a detachable manner, to the shelf 42 so as to be spaced apart by a distance corresponding to the spacing between the supporting members 38. In order to attach a shelf 42 having bearers secured to it to the supporting members 38, it would be applied at the desired height to the front face of the members 38 in a manner to engage the counterpart ribs and grooves of the supporting and bearer members.

Fig. 15 shows another form of supporting member comprising an upright 46 in strip form, the opposing lateral faces of which are provided with ribs 47 arranged in a chevron-like pattern on each face as shown. It will be appreciated that such an upright may be utilised in various forms. Channel-type bearer members of the kind shown in Fig. 3 may be applied to the member 46 so as to project from either side thereof.

Fig. 16 shows a further variation of bearer member which is of channel-section to engage over a corrugated fillet 48. The interior of the channel is provided with corrugations to match those of the member 48 as has been described above but in this case also the exterior side surfaces of the bearer members are ribbed and grooved at 49, 50, as shown to match the corrugations of the supporting member 48 whereby the outside lateral faces of the bearer member present a substantially continuous patterned appearance with the supporting member 48.

Fig. 17 shows a vertical supporting member 51 having side faces 52, one of which is provided with rows of grooves 53 forming guideways. The member 51 may be mounted upon a suitable base or between top and bottom supports, or it may be attached by any known means to a panel, as indicated in dotted lines at 54. To be associated with the member 51 is the bearer member 55 for a display bracket 56. The bearer member 55 comprises a channel 57 one inner face of which is provided with an inwardly-projecting pin 58 forming a guide member. If desired a pin may be provided on each of the two faces and the supporting member be grooved on both side faces. Moreover, two or more pins 58 may be used to define a single row and one or more than one row may be provided. A space between the rows of pins could form a guideway. The location of the pin or pins is such that the bearer member may be presented to the forward face 59 of the member 51 so that the pin 58 or the leading pin as the case may be engaged in the end of a selected groove 53. After engagement of a pin or pins in a groove or grooves, the bearer member is moved in a downwards and inwards direction with reference to the upstanding supporting member 51 until the channel 57 embraces the member 51 at which time the rear face or base 60 of the channel 57 will engage the forward face 59 of the support 51, so that these two surfaces form inter-engaging abutments or stops to prevent further downward and inward movement of the bearer 57.

In Fig. 18 the upstanding supporting member 61 is provided with a channel portion 62 having pins 63. Similarly to the arrangement of Fig. 17, two or more pins 63 may be provided in each row and a plurality of rows in a vertical direction may be provided. Alternatively, only one pin may be used. In association with the support 61, the bearer member 64 for the bracket 56 is provided with one or more grooves 65 on one or both of the side faces 66 of a fillet-like projection of the bearer. The action is the same as in Fig. 17 inasmuch as the pin is engaged in a groove and the bearer member slides downwardly with respect to the supporting member 61 and is removed in an upwardly inclined motion to disassociate the bearer from the vertical support. If desired the channel of the supporting member may have grooves and the bearer have an outwardly-projecting pin or pins.

In Fig. 19 is shown an arrangement in which the vertical support includes a fillet 67 for example projecting from a panel 68 and comprising a plurality of grooves 69, the width of which is greater than the diameter of pins 70 located on the inside faces 71 of the channel section bearer 72 of the bracket 56. The pins 70 ride on the lower edges 72 of the grooves and, as has been mentioned before, the width of the grooves is such that the fillet 67 could be regarded as having a planar surface 73 provided with a plurality of ribs 74.

Figs. 20 and 21 show variants similar to those of Figs. 9, 10 and 11 and in which the grooves are provided by corrugated members 75, 76 respectively, the grooves being located at 77, 78 to accommodate pins 79, 80. The pins are attached either to the support or the bearer of the bracket as desired.

Similarly to the embodiments of Figs. 1–16 the material used for the members in Figs. 17 to 21 may be alloy or plastic and they may be cast, moulded, pressed or stamped. The pins could be incorporated in the moulding or could be affixed separately, e. g., they could be formed from rivets suitably held in place in the material. Alternatively, other materials and methods of manufacture could be employed, as described in connection with Figs. 1 to 16.

Figs. 22 to 24 show embodiments in which the supporting member proper and the portion provided with the guideways and/or guide members are separate parts. In Fig. 22 the part 81 having the guideways or guide member is in the form of a web 82 enlarged into a tapering longitudinal bead 83 at its rear. One side face is provided with grooves 84 for the reception of ribs or pins of a bearer member such as shown in other figures. The part 81 is held in the holding device 85 which is provided with a longitudinal slot 86 for the reception of the rounded edge 83.

Figs 23 and 24 show similar arrangements but indicate different shapes of bead and slot. In Fig. 23 the bead 87 is of circular form, as is the slot 88 in the holding device 89, and in Fig. 24 the bead of the part 90 is lozenge-shaped as shown at 91, and the slot 92 in the supporting member 93 is also similarly shaped. Other constructions are, of course possible.

Fig. 25 shows a supporting member 94 which is formed from sheet material, such as sheet metal, bent into the form of a channel and provided on its side flanks 95 with grooves 96 for the reception of ribs or pins on a bearer member as previously described. The channel is adapted to embrace and clamp firmly together two ends of decorative stands 97 and 98 which are of sheet material, such as sheet metal, and may have any desired form: these latter may stand up on a suitable surface without any additional supports or, if desired, may be secured to a suitable fixed object, e. g., a wall. It will be apparent that any convenient number of the stands may be joined together to make a decorative display.

If desired, the edges of the free ends of the stands 97 and 98 may be grooved as at 96a to receive suitable bearer members. For example, such edges may be corrugated.

Fig. 26 shows a sheet metal stand 99 bent into any desired form and having its edge 100 bent over, as indicated in Fig. 26a, by a rolling or other suitable process, the bent-over edge being provided with appropriate grooves 101 for the reception of the ribs or pin on a bearer member such as herein described.

In order to facilitate such reception, the material is stepped as at 101a so that when the edge is bent over, the ends of the grooves 101 will be located in the thickness of the steps. The grooves 101 may be directly opposed, as shown, or may be staggered on opposite sides of the edge portion 100. The grooves may also be replaced by ribs projecting outwardly in relief.

Fig. 27 shows a modification of Fig. 26 in which the edge 102 of a sheet holding device 103 is provided with a separate supporting member 104 of strip-form and having raised ribs 105 in its flanks which member is folded over into channel form and suitably clamped on to the edge 102. If desired, rivets or the like may be inserted through holes 104a. The grooves 101 and ribs 105 of Figs. 26 and 27 respectively may be joined in the material before folding over, by pressing, rolling or in an other convenient manner. In all cases the grooves or ribs may be one one or both of the opposing edges.

Fig. 28 shows another form of supporting member according to the invention comprising a show card or the like 140 made for example from cardboard or similar material, with a thin metal facing (or edging) 141 which is turned over the back of the card at 142, and is crinkled or corrugated, or provided with ribs or grooves, at one or more edges as shown at 143 to provide inclined guideways 144 on either one or both sides of the card for the reception of suitable bearer members. In this manner, a showcard or the like, which is generally provided with a strut (not shown) for supporting the card on a flat base, can be made to support brackets holding articles or materials advertised by the card.

Figs. 29 and 30 show further modifications of the invention in which the supporting members are formed in of a sheet of flat material, such as metal.

In Fig. 29 the metal is firstly provided with ribs or similar protuberances 125 from the flat sheet in selected places and then is folded as at 126 to form flanges 127 projecting from the face of the sheet material 124. The preformed ribs or the like then form guideways for appropriate bearer members.

Fig. 30 is a variation of Fig. 29 in which a sheet of flat material 128 is provided with channels as at 129 by means of a suitable folding operation, the inner faces of the said channels being provided with grooves 130 to form guideways for appropriate bearer members. Similarly as described in connection with the ribs 125 in Fig. 29, the grooves 130 are formed at the selected positions in the flat material, for example by stamping or rolling, before the folding operation.

It will be understood that the flanges 127 or the channels 129 may be formed on only one or on both sides of the material and that the distance between the flanges or channels may be varied at will. The spaces between the flanges or channels may be embellished by suitable designs or provided with advertising matter, e. g. by printing.

Fig. 31 shows another form of the invention in which the bearer member 106 is separable from the bracket 107, analogous to the arrangement of Fig. 8. The bearer member 106 is provided with substantially vertical grooves 108 to receive bracket 107 which is flat like a shelf and provided with an extension 109 having flanges 110 adapted to be engaged in the said vertical grooves 108. This form of bracket may be made from sheet metal which is pressed to shape and above the turned-in flanges 110, the projection 109 is finished off with a lip 111. In order to permit the bearer member 106 to be engaged a supporting member 113, the bearer member has a channel 114 formed between projecting walls 115 and the walls are terminated at the top and bottom by inwardly-directed flanges 116 forming guide members which are adapted to engage within any selected adjacent pair of grooves of suitable shape 117, 118 on either side of the supporting member 113. As shown, the projecting walls 115 are arranged so that the inwardly directed flanges 116 slope downwardly and away from the bracket 107 so that the engagement of the bearer and the supporting member is in a downward direction and away from the bracket as in all the examples described in my said copending application.

Figure 32:
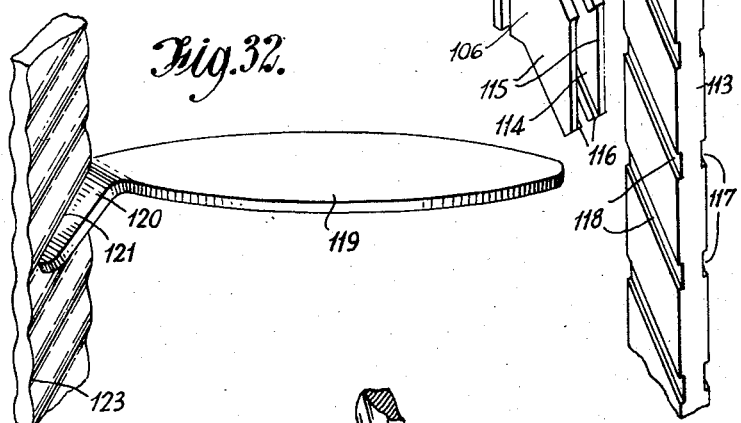
Figure 33:
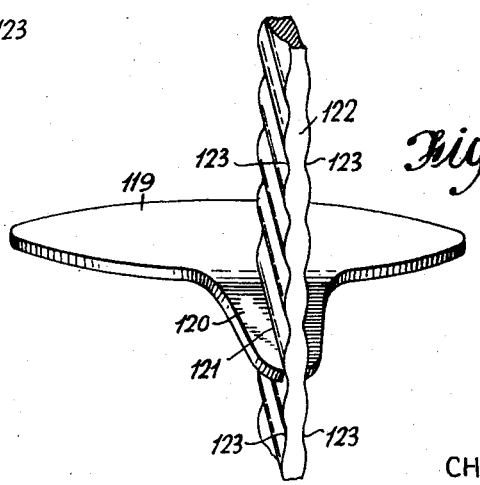

Figs. 32 and 33 represent a modification of Figure 31 in which the bearer member is integral with the bracket. In this case the bracket 119 is also made from flat material and has a projecting ear 120 forming a bearer member provided with a slot 121 of a width to enable the tray to be supported on the supporting member 122. The ear 120 is bent downwards out of the plane of the bracket so that the slot 121 then forms inclined fingers. The bracket 119 is engaged over the supporting member 122 by sliding the slot 121 into the grooves 123. In this embodiment therefore the slot edges of the bearer member constitute the guide members.

Figure 34 shows another form of bearer member which is removable from its bracket and which lends itself to easy manufacture, for example, by means of stamping and rolling. The bearer member 131 is formed by stamping from a sheet of suitable material such as metal, in such a manner as to provide a socket 132 for the reception of a tang 133 depending from a suitable bracket 134 which may be made as a tray or shelf or of any other convenient form. The member 131 is also provided with two pairs of projecting inclined fingers 135 which are adapted to engage within the guideways 136 of a supporting member 137. In order to effect easy engagement, the ends of the fingers 135 may be rounded off as shown at 138 and also the inner edges of these fingers may be radiussed or otherwise shaped to fit the configuration of the grooves 136.

The supporting member 137 may be made from a variety of materials and may for example be made of glass. Although depicted as a separate element, it will be apparent that the supporting member 137 may be in the form of the edge of a piece of sheet material, for example, as shown in Fig. 5, the grooves 136 being provided in appropriate edges.

It will be apparent that the invention has been described only by way of example and that various modifications could be made to the specific details hereinbefore set forth without in any way departing from its scope. For example, the supporting member could be formed of a glass sheet having one or more of its edges provided with inclined guideways, e. g. by moulding. Furthermore, the brackets which are shown as trays in Figs. 31 to 34 may be of various types and shapes depending upon the required use, for example, the bracket may be in the form of a rod or hook.

I claim:

1. A cantilever bracket supporting arrangement comprising a generally vertical support member and at least one cantilever bracket, a bearer member at one end of said bracket, a deep channel in one of said members provided with continuous side walls, a projecting part on the other of said members, said projecting part and said channel having a rectangular cross-section and said channel having approximately the same width as said projecting part for receiving said projecting part therein, at least one of the opposed side walls of said channel and the corresponding face of said projecting part being provided with engaging means comprising at least one interfitting rib and groove which are inclined downwardly and away from said bracket with said rib extending transversely into and said groove opening into said channel when said means are interfitted, the said engaging means on said support member being multiplicated and regularly spaced one from another vertically therealong to provide a widely diversified vertical adjustability of said bracket on said vertical support member.

2. An arrangement as claimed in claim 1 in which said bearer member is separable from said bracket, mutually interfittable engaging means being respectively provided on said bracket and said bearer member.

3. An adjustable bracket support as claimed in claim 1 in which the sides of said channel are formed of corrugated strip material.

References Cited in the file of this patent

UNITED STATES PATENTS

| | | |
|---|---|---|
| 327,129 | Bains | Sept. 29, 1885 |
| 368,740 | Trimble | Aug. 23, 1887 |
| 479,424 | Huff et al. | July 26, 1892 |
| 863,068 | Huff | Aug. 13, 1907 |
| 1,105,410 | Detwiler | July 28, 1914 |
| 1,213,641 | Hickman | Jan. 23, 1917 |
| 2,644,591 | McMahan | July 7, 1953 |
| 2,723,818 | Hurtzig | Nov. 15, 1955 |

FOREIGN PATENTS

| | | |
|---|---|---|
| 469,679 | France | May 26, 1914 |
| 599,360 | Great Britain | Mar. 10, 1948 |